(12) United States Patent
Ates et al.

(10) Patent No.: US 11,901,542 B2
(45) Date of Patent: Feb. 13, 2024

(54) ULTRAFAST ELECTRODEPOSITION OF CARBON AS A COATING AGENT FOR LITHIUM ION BATTERY APPLICATIONS

(71) Applicant: Xerion Advanced Battery Corporation, Kettering, OH (US)

(72) Inventors: Mehmet Nurullah Ates, Kettering, OH (US); John David Busbee, Beavercreek, OH (US); John Berkeley Cook, Beavercreek, OH (US); Timothy Thomas Lichtenstein, Carol Stream, IL (US)

(73) Assignee: Xerion Advanced Battery Corporation, Kettering, OH (US)

(*) Notice: Subject to any disclaimer, the term of this patent is extended or adjusted under 35 U.S.C. 154(b) by 0 days.

(21) Appl. No.: 17/496,683

(22) Filed: Sep. 17, 2021

(65) Prior Publication Data

US 2022/0115633 A1 Apr. 14, 2022

Related U.S. Application Data

(63) Continuation of application No. 16/778,733, filed on Jan. 31, 2020, now abandoned.

(Continued)

(51) Int. Cl.
*H01M 4/04* (2006.01)
*C25D 9/08* (2006.01)
(Continued)

(52) U.S. Cl.
CPC ............ *H01M 4/0452* (2013.01); *C25D 9/08* (2013.01); *H01M 4/0471* (2013.01);
(Continued)

(58) Field of Classification Search
CPC ..... H01M 4/0452; H01M 4/366; H01M 4/386
See application file for complete search history.

(56) References Cited

U.S. PATENT DOCUMENTS

| 2006/0228575 A1* | 10/2006 | Klos | ................. F16B 33/008 428/621 |
| 2011/0111308 A1* | 5/2011 | Halalay | ............ H01M 10/0568 429/344 |

(Continued)

FOREIGN PATENT DOCUMENTS

| CN | 102102215 A | * | 6/2011 |
| CN | 102102215 A1 | | 6/2011 |
| JP | 3806677 | | 8/2006 |

OTHER PUBLICATIONS

Yang, machine translation, CN 102102215 A (Year: 2011).*

(Continued)

*Primary Examiner* — Hosung Chung
(74) *Attorney, Agent, or Firm* — O'BANION & RITCHEY LLP; John P. O'Banion

(57) ABSTRACT

A method of electroplating (or electrodeposition) carbon to coat anode and cathode active materials used in Li-ion batteries (LIBs) for improving their cycle life. The electroplating of the carbon coating from the carbon source is ultrafast, preferably taking less than 10 seconds. The carbon source can be comprised of an acetonitrile, methanol, ethanol, acetonitrile, nitromethane, nitroethane or N,N-dimethylformamide (DMF) solution. The protective carbon coating may be used also in gas sensors, biological cell sensors, supercapacitors, catalysts for fuel cells and metal air batteries, nano and optoelectronic devices, filtration devices, structural components, and energy storage devices.

15 Claims, 11 Drawing Sheets

Related U.S. Application Data

(60) Provisional application No. 62/810,607, filed on Feb. 26, 2019.

(51) Int. Cl.
*H01M 10/0525* (2010.01)
*H01M 4/139* (2010.01)
*H01M 4/62* (2006.01)
*H01M 4/38* (2006.01)
*H01M 4/525* (2010.01)
*H01M 4/505* (2010.01)
*H01M 4/36* (2006.01)
*H01M 4/1391* (2010.01)
*H01M 4/1395* (2010.01)

(52) U.S. Cl.
CPC ......... *H01M 4/139* (2013.01); *H01M 4/1391* (2013.01); *H01M 4/1395* (2013.01); *H01M 4/366* (2013.01); *H01M 4/386* (2013.01); *H01M 4/505* (2013.01); *H01M 4/525* (2013.01); *H01M 4/625* (2013.01); *H01M 4/628* (2013.01); *H01M 10/0525* (2013.01)

(56) References Cited

U.S. PATENT DOCUMENTS

2016/0261005 A1\* 9/2016 Rustomji ............... H01G 11/60
2020/0286690 A1\* 9/2020 Pinault .................. C25D 13/12

OTHER PUBLICATIONS

Cao et al., Electrodeposition diamond-like carbon films from organic liquids, 368 Thin Solid Films 203 (Year: 2000).\*
Aso, Original & Machine Translation, JP-3806677-B2 (Year: 2006).\*
Yang, Machine Translation, CN 102102215 A (2011).
Cao, et al., "Electrodeposition diamond-like carbon films from organic liquids," 368, Thin Solid Films 203 (2000).

\* cited by examiner

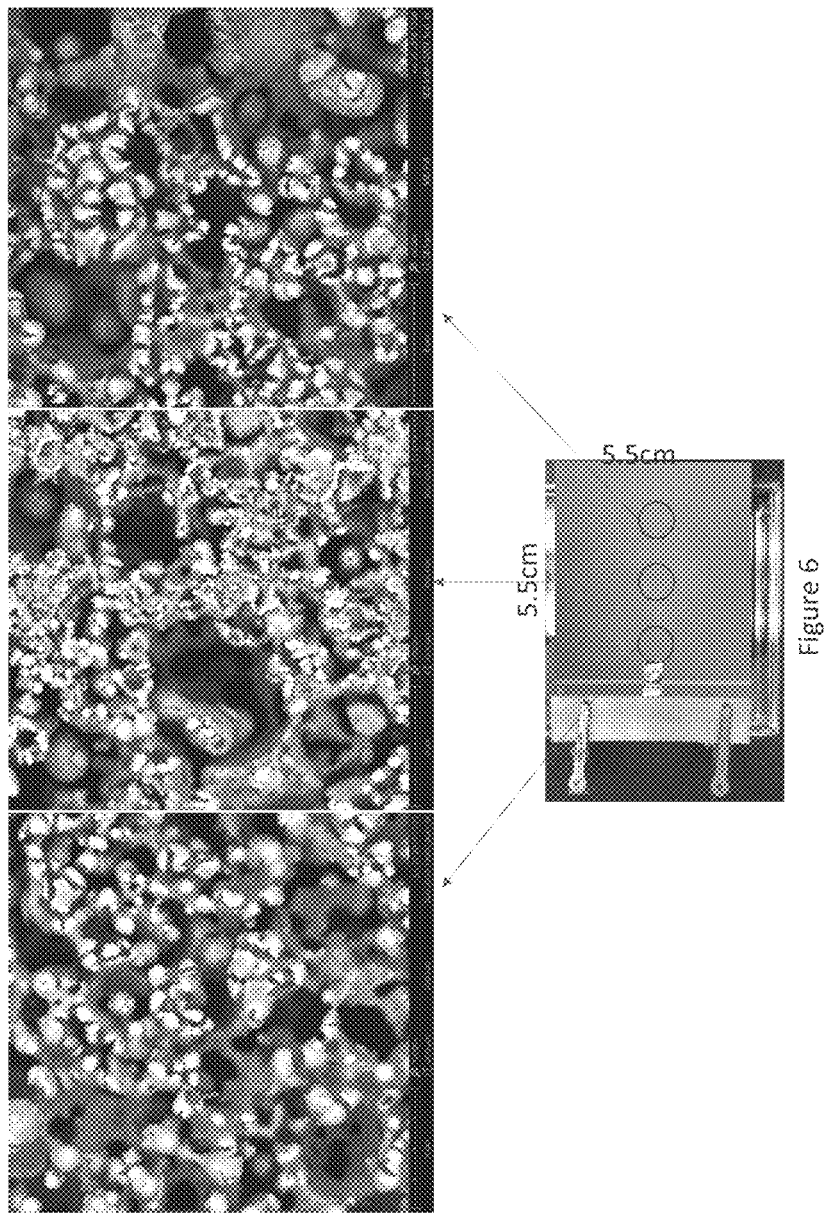

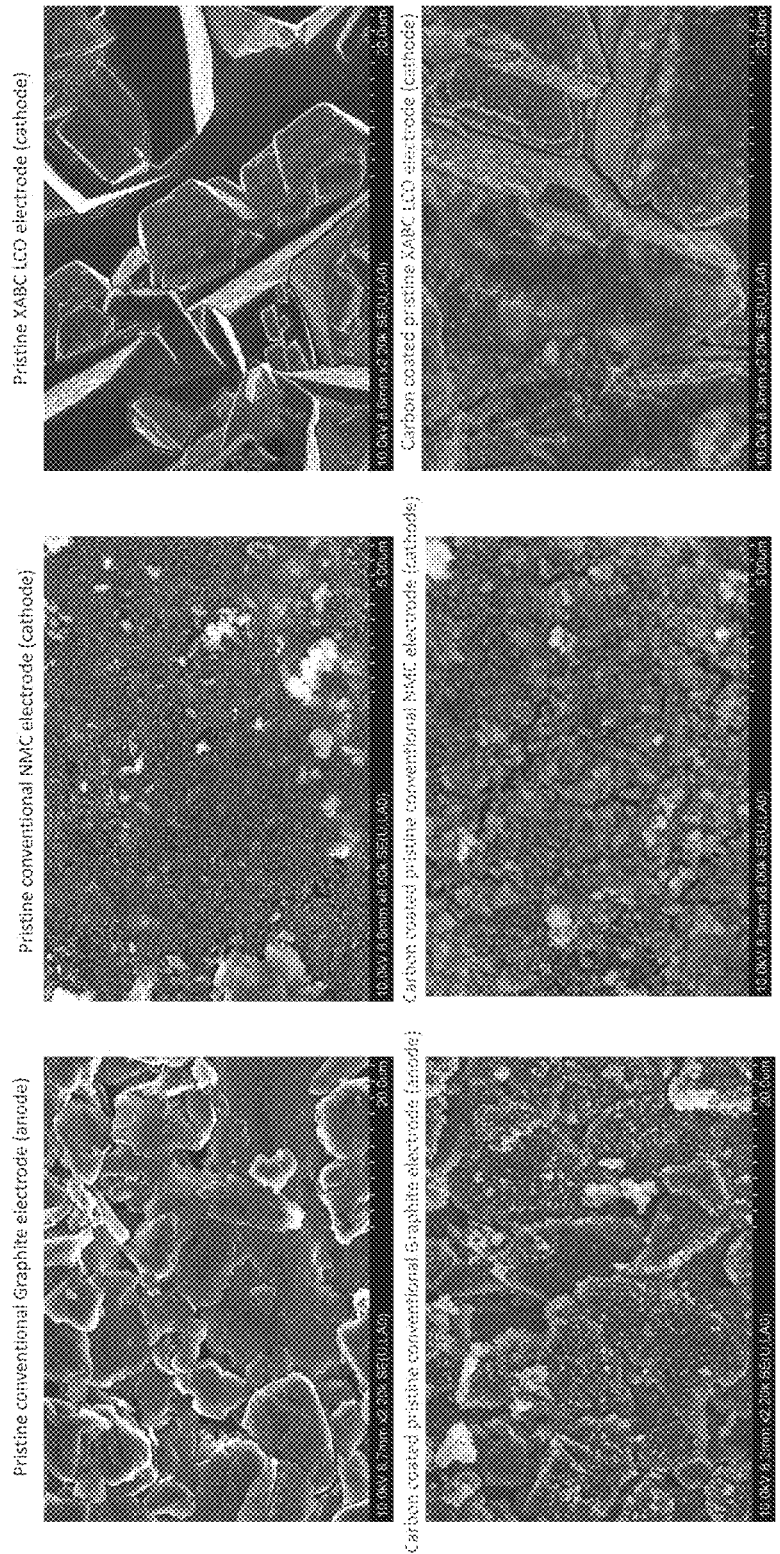
Figures 7A-F

ULTRAFAST ELECTRODEPOSITION OF CARBON AS A COATING AGENT FOR LITHIUM ION BATTERY APPLICATIONS

CROSS-REFERENCE TO RELATED APPLICATIONS

This application is a continuation of U.S. patent application Ser. No. 16/778,733 filed on Jan. 31, 2020, incorporated herein by reference in its entirety, which claims priority to, and the benefit of U.S. provisional patent application Ser. No. 62/810,607 filed on Feb. 26, 2019, incorporated herein by reference in its entirety. This application is also a continuation of U.S. patent application Ser. No. 17/478,781 filed on Sep. 17, 2021, which is a continuation of U.S. patent application Ser. No. 16/778,733 filed on Jan. 31, 2020, which claims priority to, and the benefit of U.S. provisional patent application Ser. No. 62/810,607 filed on Feb. 26, 2019.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

SUMMARY OF THE INVENTION

The present disclosure relates to a method for electroplating (or electrodeposition) carbon to coat anode and cathode active materials used in Li-ion batteries (LIBs) for improving their cycle life. The disclosed method of carbon coating can be applied to both conventional slurry-based electrodes and non-conventional materials such as Atomic Layer Deposition (ALD) electroplated cathode and anode active materials that do not contain PVDF or carbon additives.

Although the cycle life of current LIBs is in a decent range (above 800 cycles), new cathode and anode chemistries are still being explored to improve the energy density and power density of LIBs without compromising the cycle life. One of the new anode chemistries that can boost the current energy and power densities of LIBs is Silicon based anode materials. Several major bottlenecks are impeding Si anodes from being commercialized. These drawbacks can be listed as i-) very large volume expansion which leads to particle cracking, ii-) uncontrollable solid electrolyte interphase (SEI) growth, and iii-) low electrical conductivity. Several approaches have been presented in the literature to mitigate aforementioned problems which includes i-) engineering the void space of anode active material which can be achieved through architecture modification ii-) surface coating of Si particles and iii-) decreasing the Si particle size (see e.g., Sujong Chae, Minseong Ko, Kyungho Kim, Kihong Ahn, and Jaephil Cho, *Confronting Issues of the Practical Implementation of Si Anode in High-Energy Lithium-Ion Batteries, Joule* 1, 47-60, Sep. 6, 2017).

We disclose in this invention ultrafast electroplating carbon as a coating agent for various anodes and cathode active materials for LIB application. Specifically, we disclose coating Si anodes by electroplating carbon thereby increasing LIB energy and power densities with enhanced cycle life. In one example, by coating the Si anode active material with carbon, we demonstrated that cycle life of the Si based LIB in this demonstration of the technology was boosted by 40%.

Electroplating of carbon has been shown in the literature (see e.g., Chuanbao Cao, Hesun Zhu, Hao Wang, *Electrode position diamond-like carbon films from organic liquids, Thin Solid Films* 368 (2000) 203-207). Carbon coating with conventional methods such as wet chemistry has been also documented (see See-How Ng, Jiazhao Wang Dr., David Wexler Dr., Konstantin Konstantinov Dr., Zai-Ping Guo Dr., Hua-Kun Liu Prof, volume 118, issue 41, Angewandte Chemie Highly Reversible Lithium Storage in Spheroidal Carbon-Coated Silicon Nanocomposites as Anodes for Lithium-Ion Batteries). But to the best of our knowledge ultrafast electroplating carbon on Si or any other cathode or anode materials for LIBs has not been published or disclosed.

The major aspects or claims of this invention are as follows:
1-) Ultrafast (less than 10 s) electroplating carbon as coating agent for Li-ion battery cathode and anode materials to boost the cycle life in a real lithium ion battery.
2-) Judiciously finding the right surface area of the counter electrode. We found in house synthesized Ni foam was best suited for homogeneity of the carbon coating, not Ni foil or commercial Ni foam.
3-) Appropriately finding the optimized working and counter electrode distance which greatly affects the homogeneity of the coating.
4-) Finding the optimum thickness of coating via modifying plating condition for conformal and uniform carbon coating (voltage, wave form of deposition etc.) In order to obtain conformal coating, one has to apply pulse wave form of deposition in order to prevent agglomeration of carbon particles on the surface.
5-) Type of carbon based on Raman and XPS.

DETAILED DESCRIPTION OF THE INVENTION

Figure 1:
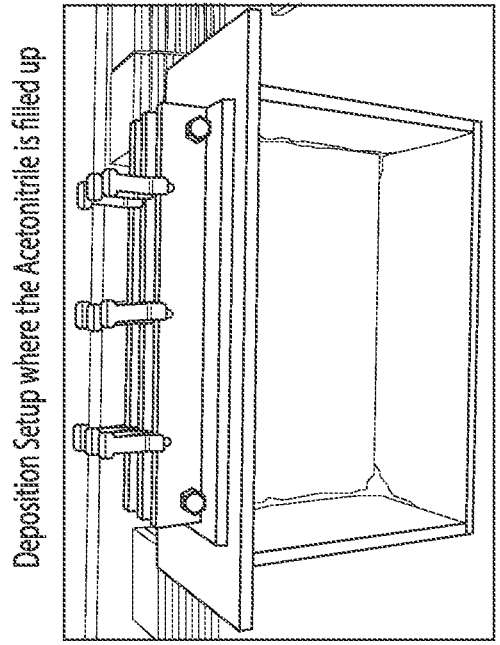
FIG. 1. Picture of experimental apparatus used to apply high voltage to the counter electrode to break down the acetonitrile and produce carbon film on working electrode.

As illustrated in FIG. 1, a high voltage (i.e., 1200V) was applied to the counter electrode to break down the acetonitrile and produce a carbon film on the working electrode which can be anode or cathode active materials for LIBs. Note that although 1200V was used for this particular experimental set up, other voltages work and give different attractive properties. For example, voltages in the range of from about 300V to about 2000V should also work.

Total deposition time can vary to modify the thickness of the carbon coating. Wave form of deposition can also change, constant voltage, constant current, pulse voltage or current and combination thereof. Currently, Applicants use 1200V 6s on time for coating. The higher potential gives thicker carbon deposition while also the longer deposition gives thicker carbon deposits.

Traditionally carbon coating on Si anode takes several hours (see e.g., *Nonfilling Carbon Coating of Porous Silicon Micrometer-Sized Particles for High-Performance Lithium Battery Anodes*, Zhenda Lu, Nian Liu, Hyun-Wook Lee, Jie Zhao, Weiyang Li, Yuzhang Li, and Yi Cui, C S Nano, 2015, 9 (3), pp 2540-2547).

Figure 2:
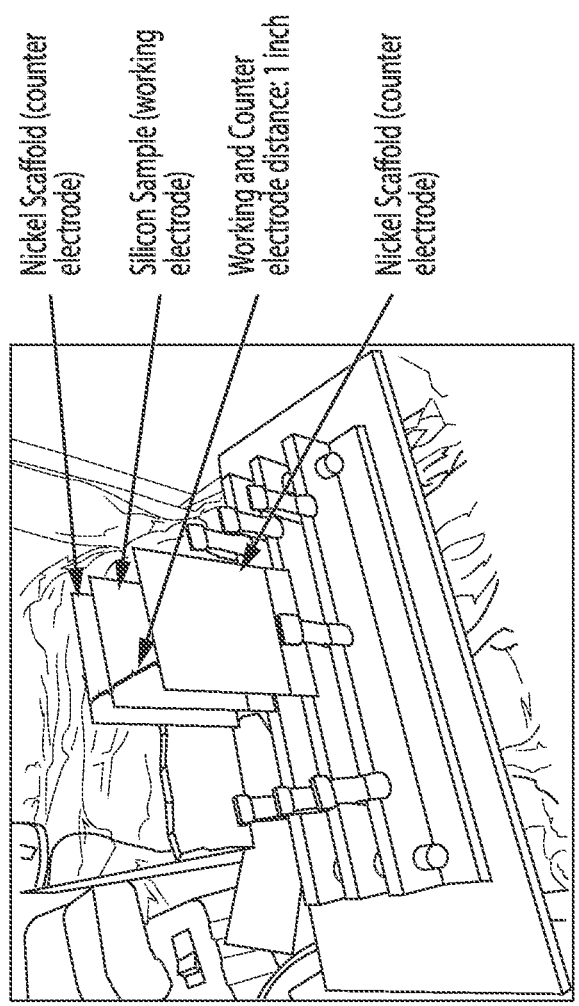
FIG. 2. Picture of a depositional set up where the acetonitrile is filled up.

As illustrated in FIG. 2, electroplating of a carbon coating was carried out by
immersing a working electrode and two counter electrodes into an acetonitrile solution in ambient atmosphere; electrodepositing carbon onto the surface of the working electrode at room temperature; removing the working electrode from the bath; drying the working electrode under dynamic vacuum at 60° C. and if desired and appropriate heat the sample up to 300° C. for 15 minutes to increase silicon carbon adhesion.

Figure 3:
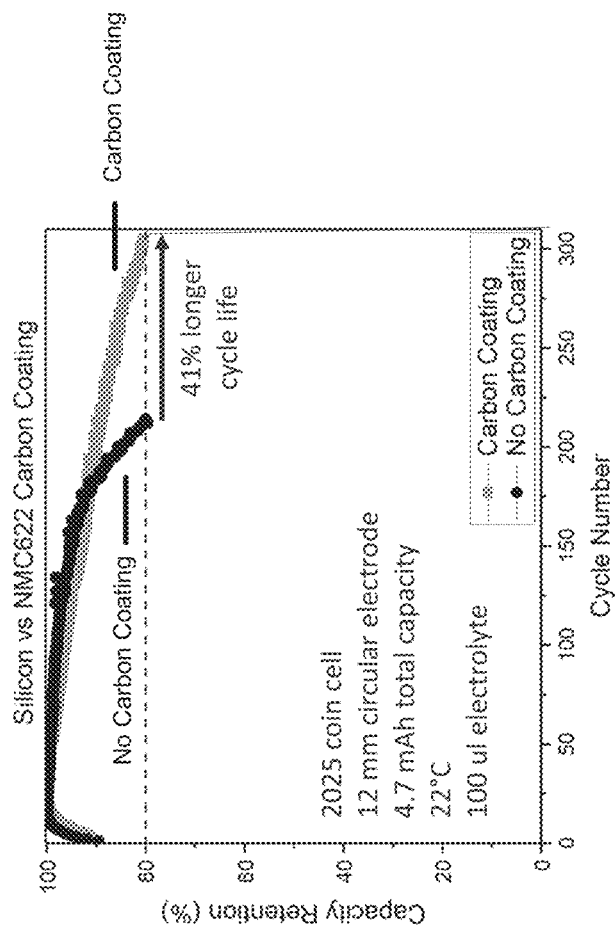
FIG. 3. Cycle life of NMC/Si full cells where Si was coated with carbon. Carbon coating treatment was done at 1200V, 6 s on, 300° C. 20 min heat treatment under Argon.

As illustrated in FIG. 3, application of the ultrafast carbon coating process results in the enhancement of cycle life in a real battery system. In particular, a carbon coating treatment 1200V, 6 s on, 300° C. 20 min heat treatment under Argon was carried out by full cell with 4.2 mAh/cm2 cathode-4.6 mAh/cm2 anode, cycled between 4.15-2.5V @C/2 charge and discharge. Both cells contain same metal scaffold plated with Si from organic solvents. Both cells also contain the same commercial electrolyte from SoulBrain. The electrolyte consists of 1.2M LiPF6 salt dissolved in organic solvent which is also a mixture of ethylmethyl carbonate, ethylene carbonate, diethyl carbonate, dimethyl carbonate solvents. The ultrafast carbon coated Si showed superior cycle life as compared to the bare Si electrode.

Figure 4:
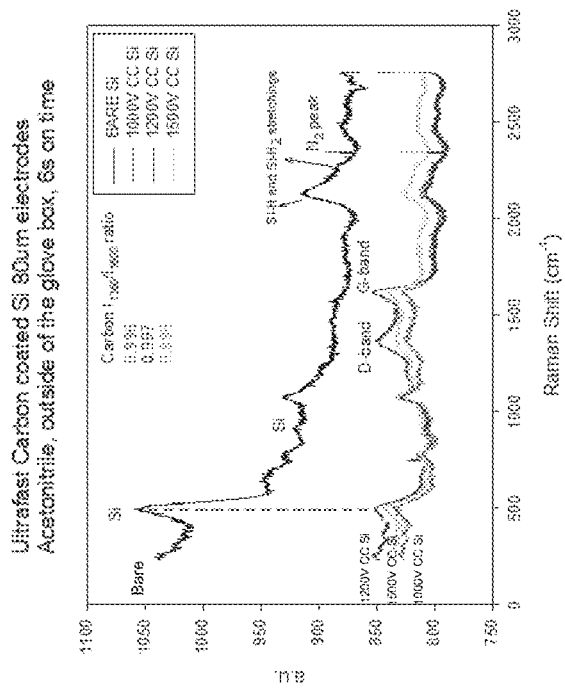
FIG. 4. Raman spectra of pristine Si and carbon deposited Si electrodes at different deposition potential FIG. 5A. SEM image of pristine Si on Ni scaffold FIG. 5B. SEM image of after carbon deposition of Si on Ni scaffold FIG. 6. SEM images showing the homogeneity of carbon deposition across the Si electrode FIGS. 7A-F. SEM images showing application of carbon coating to other conventional cathode and anode chemistries FIGS. 8A & 8B. Raman spectra of pristine Si and carbon coating applied to other conventional cathode and anode chemistries FIG. 9A. XPS analysis on ultrafast carbon coated Si on 80 um Xerion Ni foam showing spectrum of Si 2p core level emission.

FIG. 4 illustrates the Raman spectra of pristine Si and carbon deposited Si electrodes at different deposition potential. The conventional peaks for carbon can be seen at 1360 and 1600 cm-1 wavelength, which indicates that the ultrafast carbon coating process has formed a carbon coating on the silicon electrode. At all deposition potentials the carbon peaks are formed. The Si characteristic peak (around 500 cm-1) is getting less intense suggesting the carbon film formation. The width of D band in carbon peak usually signifies disordered nature of carbon which might indicate graphitic carbon is preferentially formed at 1200V compared to other deposition potentials which do not show that much of a wide D band peak.

Figure 5B:
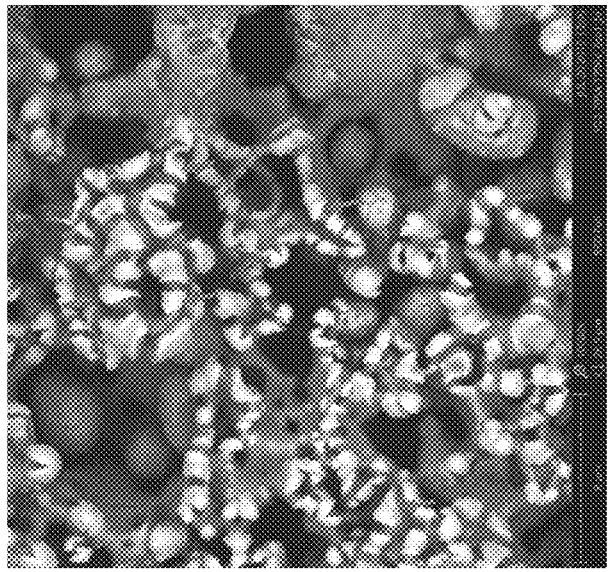
Figure 5A:
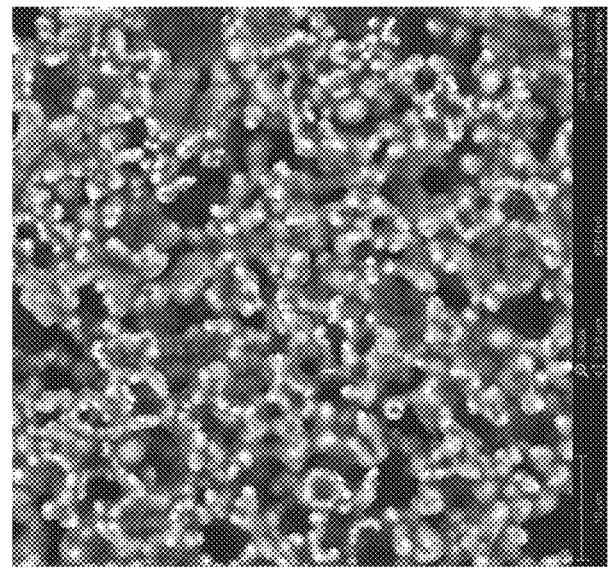

FIG. 5A is an SEM image of pristine Si on Ni scaffold and

FIG. 5B is an SEM image after Carbon Deposition of Si on Ni scaffold demonstrating the actual carbon particles. The arrows in FIG. 5B indicate where the carbon films formed on the surface of the Si anode electrode.

FIG. 6 contains 3 SEM images taken along the length of the Si electrode. The 3 SEM images show the homogeneity of carbon deposition across the Si electrode.

FIGS. 7A-F are all SEM images showing application of carbon coating to other conventional cathode and anode chemistries. It is clear from these images that carbon coating can be applied to other conventional cathode and anode chemistries, which will enhance their electrochemical properties like cycle life, power, and charge time.

Figures 8A, 8B:
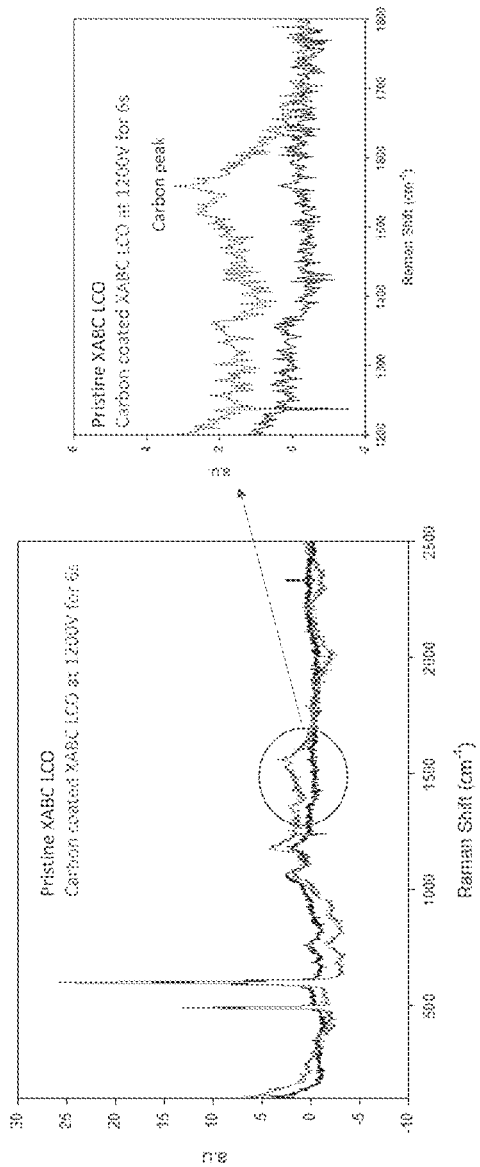

FIGS. 8A & 8B illustrate Raman spectra of pristine Si and carbon coating applied to other conventional cathode and anode chemistries. Since slurry based commercial electrodes have carbon source blended with active material, it is hard to distinguish carbon peaks due to the carbon that is already incorporated in the electrode. For this reason a XABC LCO electrode, which does not contain carbon, was selected to demonstrate the ability of this method to coat cathode materials. It should be interpreted from this demonstration that carbon can also be coated on conventional cathode materials.

Figures 9A, 9B:
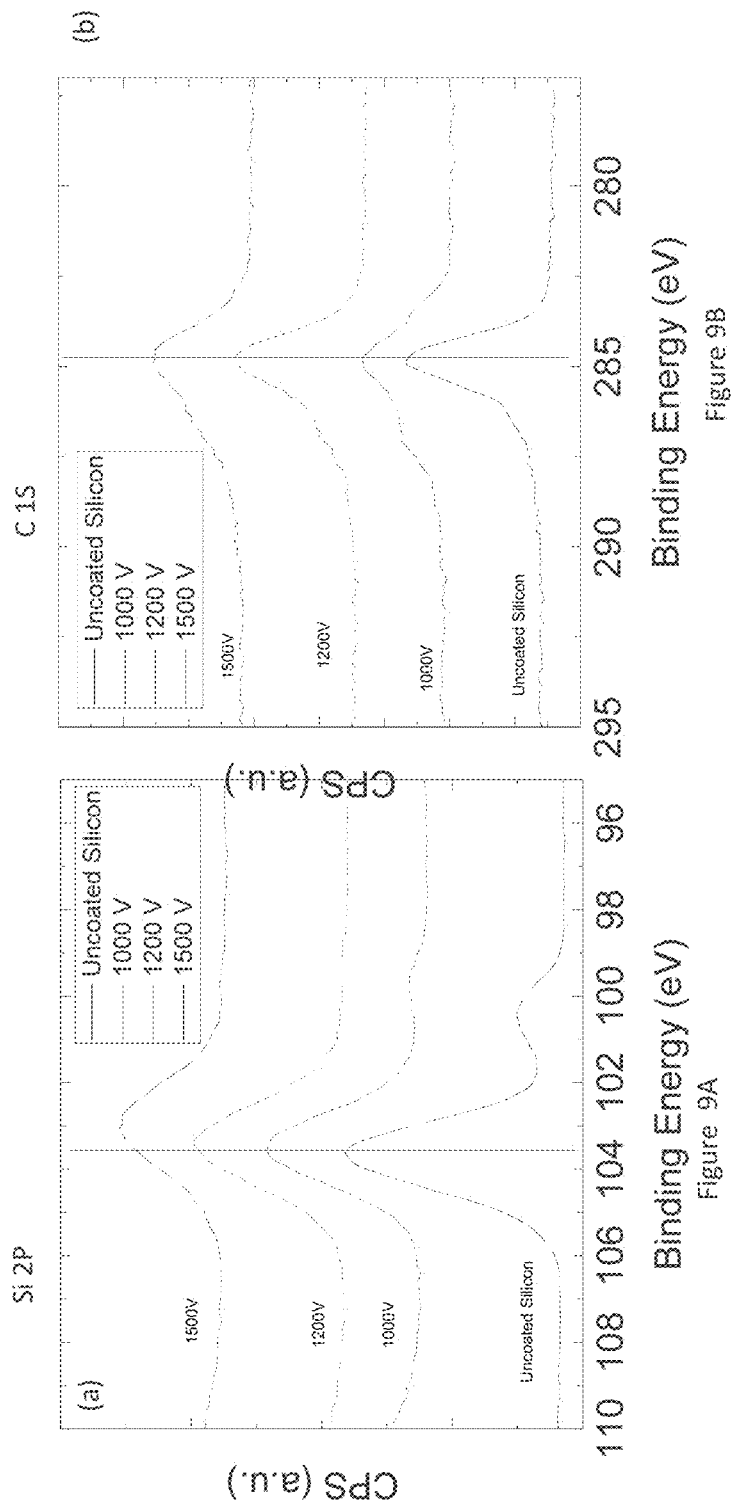
FIG. 9B. XPS analysis on ultrafast carbon coated Si on 80 um Xerion Ni foam showing spectrum of C 1S core level emission.

FIG. 9A is an XPS analysis on ultrafast carbon coated Si on 80 um Xerion Ni foam showing spectrum of Si 2p core level emission. It was coated from acetonitrile at various voltages using a 6 second voltage pulse. The peak at ~100 eV corresponds to metallic silicon while the peak at ~104 eV corresponds to $SiO_2$. The energies between 100 eV and 104 eV correspond to the silicon sub-oxides, such as, $Si_2O$, SiO, and $Si_2O_3$. XPS is extremely surface sensitive (~10 nm penetration depth—typical), and as a result the intensity of the silicon emissions diminish as the deposition voltage is increased. The carbon film becomes thicker with higher deposition voltages. In addition, there is a slight shift towards lower binding energy for the films coated at 1200V and 1500 V possibly because a small amount of silicon carbide is formed. The formation of silicon carbide is beneficial because the adhesion of the carbon film is chemically bound to the silicon.

FIG. 9B is an XPS analysis on ultrafast carbon coated Si on 80 um Xerion Ni foam showing spectrum of C 1S core level emission. It was coated from acetonitrile at various voltages using a 6 second voltage pulse. The peak at ~285 eV corresponds to c-c bonds while the broad shoulders at higher eV correspond to oxidized forms of carbon, such as, carbon connected to ether, carbonyl, and carboxylic groups. The shoulder of 1200 eV at lower binding energy corresponds to sp2-forms of carbon. Most materials analyzed by XPS will show sp3 carbon emission, which is call the adventitious carbon signal—even on materials that are not carbon coated. The carbon signal in FIG. 9B shows a high degree of sp2, sp3 and oxidized carbon, and therefore indicates the presence of a carbonaceous film which was applied from the electrochemical deposition.

Analysis of both spectra simultaneously, combined with the Raman spectroscopy data proves unequivocally the presence of electrodeposited carbon.

Figure 10B:
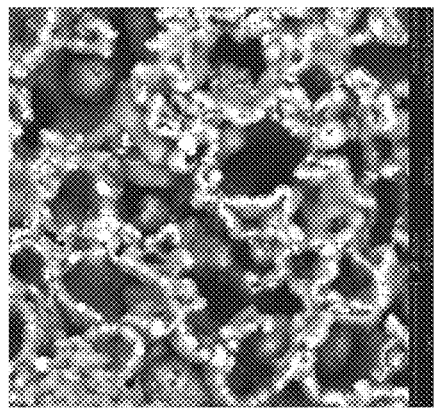
FIG. 10B. SEM image of carbon deposition of Si on Ni scaffold when there was a 1 inch distance between the working electrode (W.E.) and the counter electrode (C.E).
Figure 10A:
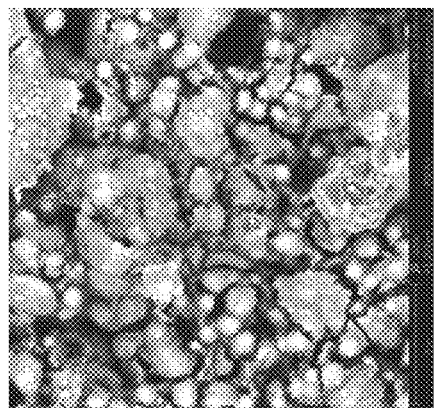
FIG. 10A. SEM image of carbon deposition of Si on Ni scaffold when there was a 0.5 inch distance between the working electrode (W.E.) and the counter electrode (C.E).

As illustrated in FIGS. 10A and 10B, the distance between the working electrode (W.E.) and counter electrode (C.E.) greatly affects the homogeneity of the carbon coating. FIG. 10A, with a 0.5 inch distance between the W.E. and C.E., shows a thick carbon coating on the surface versus the 1 inch distance between the W.E. and C.E. in FIG. 10B which shows less agglomeration on the surface. Both FIGS. 10A and 10B show the Si deposited Ni foam.

Figure 11B:
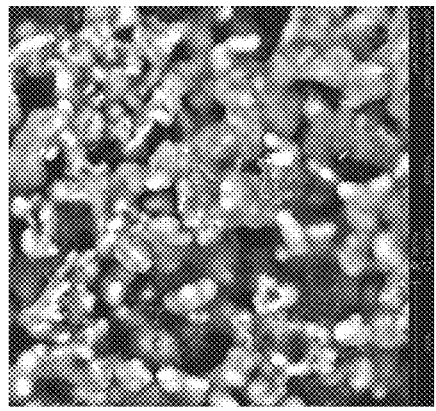
FIG. 11B. SEM image of carbon deposition of Si on in-house produced Ni foam that has paired with in house produced Ni scaffold having a high surface area as counter electrode.
Figure 11A:
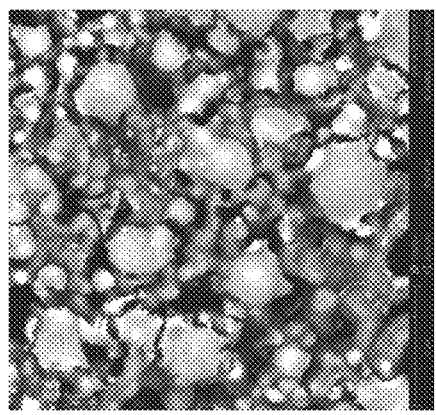
FIG. 11A. SEM image of carbon deposition of Si on in-house produced Ni foam that has paired with commercial Ni scaffold having a low surface area as counter electrode.

As illustrated in FIGS. 11A and 11B, finding the right surface area of the counter electrode is important for obtaining a conformal carbon coating. FIG. 11A, with a commercial Ni foam having a low surface area, does not produce the uniform deposition of carbon particles shown in FIG. 11B obtained by using an in-house produced Ni foam having a high surface area.

Figure 12:
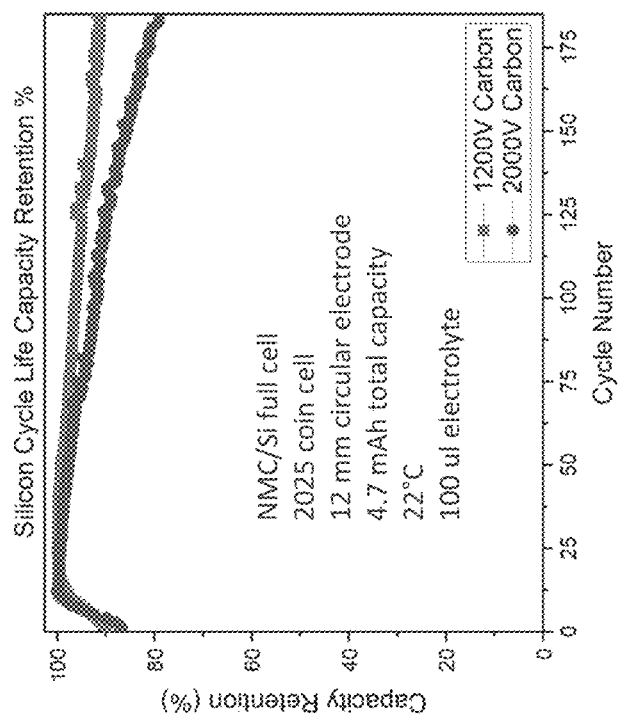
FIG. 12. The graph shows cycle life of two different electroplating potentials of carbon. The NMC/Si full cell with square symbol where Si was coated at 1200V and NMC/Si with round symbol where Si was coated at 2000V.

FIG. 12 shows how the deposition potential affects the cycle life performance of Si based LIB. In particular, FIG. 12 shows a carbon coating treatment at 1200V and 2000V, in an NMC/Si full cell treatment under Argon. FIG. 12 shows the superiority of 1200V as compared to 2000V.

In general, the present invention discloses a method of electrodepositing a carbon coating onto the surface of a working electrode, i.e. cathode or anode materials used in LIBs, comprising the steps of:
  a) immersing a working electrode and counter electrode into an organic solvent comprising a carbon source (e.g., acetonitrile solution) in ambient atmosphere;
  b) electrodepositing a carbon coating onto a surface of the working electrode from the organic solvent at room temperature;
  c) removing the working electrode from the organic solvent;
  d) rinsing the electroplated carbon coated working electrode; and
  e) drying the working electrode under dynamic vacuum at 60° C.

The carbon source can be comprised of an acetonitrile, methanol, ethanol, nitromethane, nitroethane, or N,N-dimethylformamide (DMF) solutions or other carbon bond containing solvents and mixtures thereof. These organic solvents have carbon bonds where DC potentials are applied to break them and deposit carbon on working electrode.

The thickness of the carbon coating ranges from 1 nm to 5 um.

The electroplating is carried out in a wide range of temperature ranging from −5° C. up to 50° C. Preferably, the electroplating is carried out at room temperature and under ambient atmosphere.

The electroplating of the carbon coating is ultrafast, typically taking less than 10 seconds. In a preferred embodiment, 1200 volts is applied to the counter electrode in step (b) for about 6 seconds.

The working electrode is preferably rinsed with the organic solvent in which the carbon is plated from. For example, if the electrodeposition of carbon is carried out in acetonitrile the working electrode is rinsed with acetonitrile after carbon coating.

The working electrode is preferably dried under dynamic vacuum at a temperature of about 60° C.

The conductive counter electrode substrate used for electrodeposition preferably comprises at least one of nickel, tungsten, copper, gold, platinum, titanium, and carbon. In a preferred embodiment, the counter electrode is nickel. Fiber or foam version of these electrodes can be used if higher current densities are desired.

The working electrode during electroplating of carbon can be an either cathode or anode active materials for LIBs. The cathode materials can be $LiCoO_2$ (LCO), $LiMn_2O_4$ (LMO), $LiMnNiCoO_2$ (NMC), $LiFePO_4$ (LFP), $LiNiCoAlO_2$ (NCA), Li-rich $Li_2MnO_3 \cdot LMnNiCoO_2$ (LRNMC) electrodes and combinations thereof. It can also be doped with different transition metals of LCO, LMO, NMC, NCA, LFP and LRNMC. The anode materials can be silicon, graphite, graphene based anodes, tin, and other anode materials that can be used in Li-ion or other energy storage systems. Both cathode and anode materials may consist of composite electrode which contain binder and conductive additives.

In a preferred embodiment, the anode active material is silicon.

In another preferred embodiment, the cathode active material is selected from the group consisting of $LiCoO_2$ (LCO), $LiMn_2O_4$ (LMO), and combinations thereof.

The invention described here can be applied to cathodes and anodes of other battery and energy storage technologies like next generation Li-ion, Na-ion, Na-air, Li-air, Li—S batteries, supercapacitors etc.

In addition, this invention can be applied to battery components that are used to make solid state batteries. For example, it can be used as an engineered interface between cathodes or anodes and a solid state electrolyte to decrease the interfacial resistance. The carbon coating could be applied on a densely formed cathode or anode that may have been formed by sputtering, electrodeposition, or traditional methods.

Additionally, to meet the requirement of non-electrical conductivity, a thin non-conductive layer would be applied between the cathode or anode and solid-state electrolyte interface. This coating could consist of precisely electrodeposited silicon that is converted into electronically resistive silicon carbide through a post anneal treatment. Carbon is well known to be a good ionic conductor for Li-ions.

What is claimed is:

1. A method of electrodepositing a protective carbon coating on to the surface of cathode or anode materials used in Li-ion batteries, using an organic solvent, the method comprising:
  (a) immersing a working electrode and a counter electrode into an organic solvent comprising a carbon source in an ambient atmosphere;
  (b) electrode positing a carbon coating onto a surface of the working electrode from the organic solvent at a temperature ranging from −5° C. to 50° C. removing the carbon coated working electrode from the organic solvent;
  (d) rinsing the carbon coated working electrode with the organic solvent in which the carbon was electrode posited; and
  (e) drying the carbon coated working electrode under vacuum.

2. The method of claim 1, wherein the carbon source is a solution selected from the group consisting of acetonitrile, methanol, ethanol, nitromethane, nitroethane and N,N-dimethylformamide (DMF) and mixtures thereof.

3. The method of claim 2, wherein the carbon source is an acetonitrile solution.

4. The method of claim 1, wherein the thickness of the protective carbon coating ranges from 1 nm to 5 µm.

5. The method of claim 1, wherein the electrodepositing in step (b) is carried out at room temperature and under ambient atmosphere.

6. The method of claim 1, wherein the drying of the working electrode in step (e) is carried out under dynamic vacuum at a temperature of 60° C.

7. The method of claim 1, wherein the working electrode used for electrodeposition is comprised of an anode active material used in Li-ion batteries and selected from the group consisting of silicon, graphite, graphene-based anodes, tin, and combinations thereof.

8. The method of claim 7, wherein the anode active material used in Li-ion batteries is silicon.

9. The method of claim 1, wherein the working electrode used for electrodeposition is comprised of a cathode active material used in Li-ion batteries selected from the group consisting of $LiCoO_2$ (LCO), $LiMn_2O_4$ (LMO), $LiMnNiCoO_2$ (NMC), $LiFePO_4$ (LFP), $LiNiCoAlO_2$ (NCA), Li-rich $Li_2MnO_3 \cdot LMnNiCoO_2$ (LRNMC) electrodes and combinations thereof.

10. The method of claim 9, wherein the cathode active material used in Li-ion batteries is selected from the group consisting of $LiCoO_2$ (LCO), $LiMn_2O_4$ (LMO), and combinations thereof.

11. The method of claim 1, wherein the counter electrode is selected from the group consisting of nickel, tungsten, copper, gold, platinum, titanium, carbon and mixtures thereof.

12. The method of claim 1, wherein the counter electrode is nickel.

13. The method of claim 1, wherein the electrodepositing of the carbon coating in step (b) takes less than 10 seconds.

14. The method of claim 1, wherein a voltage of from 300 volts to 2000 volts is applied to the counter electrode in step (b).

15. The method of claim 14, wherein 1200 volts is applied to the counter electrode in step (b) for 6 seconds.

* * * * *